United States Patent [19]
Michaels et al.

[11] Patent Number: 4,510,426
[45] Date of Patent: Apr. 9, 1985

[54] MEMORY POWER SEAT CONTROLLER

[75] Inventors: Paul A. Michaels, Livonia; David L. Kaleita, Sterling Heights, both of Mich.

[73] Assignee: Lectron Products, Inc., Rochester, Mich.

[21] Appl. No.: 403,530

[22] Filed: Jul. 30, 1982

[51] Int. Cl.³ .................... G05B 23/02; H02H 3/027
[52] U.S. Cl. .................................. 318/565; 318/603; 361/96
[58] Field of Search ............... 318/565, 568, 603, 103, 318/112, 254, 138, 714, 715, 717, 721; 361/30, 31, 93, 96, 97; 180/326; 297/330

[56] References Cited

U.S. PATENT DOCUMENTS

| | | | |
|---|---|---|---|
| 3,072,231 | 1/1963 | Iding . | |
| 3,105,668 | 10/1963 | Pickles et al. . | |
| 3,135,492 | 6/1964 | Steere et al. . | |
| 3,223,377 | 12/1965 | Robbins . | |
| 3,654,519 | 4/1972 | South | 361/96 |
| 4,012,669 | 3/1977 | Gelfand | 361/97 |
| 4,052,625 | 10/1977 | Cameron | 361/23 X |
| 4,234,936 | 11/1980 | Siegal . | |
| 4,255,694 | 3/1981 | Morris | 318/565 |
| 4,264,849 | 4/1981 | Fleischer et al. . | |
| 4,267,494 | 5/1981 | Matsuoka et al. . | |
| 4,268,783 | 5/1981 | Murray | 318/565 |
| 4,271,449 | 6/1981 | Grogan | 361/96 X |
| 4,327,391 | 4/1982 | Grzebielski | 361/96 X |
| 4,412,267 | 10/1983 | Hansen | 361/31 X |

OTHER PUBLICATIONS

Richard W. Kovener, *National Semiconductor MOS Data Book*, "Power Seat With Memory", May 1980, pp. 2-151-2-154.

Primary Examiner—Stanley J. Witkowski
Assistant Examiner—Patrick C. Keane
Attorney, Agent, or Firm—Harness, Dickey & Pierce

[57] ABSTRACT

An improved electronic controller for an automobile power seat system is disclosed. The electronic controller features a microcomputer which receives command signals from a first and second group of operator actuable switches, present position signals from a monitoring circuit, and stored position signals from a memory circuit for generating control signals for directing a motive power means to adjust the position of an automobile seat. The monitoring circuit includes transducer means for sensing the current draw from the d.c. power source, and differentiating means connected to the transducer means for generating a pulse concomitantly with each commutation of the motor from the motive power means. These pulse position signals are sent to the microcomputer and then counted by an internal timer for determining the present position of the automotive seat. These pulse position signals are used to determine a "stall" condition which occurs when the rack mechanism has encountered a mechanical stop, such as when the seat reaches its full forward position. The time between these pulses is monitored and a stall condition is determined when the time between these pulses exceeds a predetermined period.

17 Claims, 2 Drawing Figures

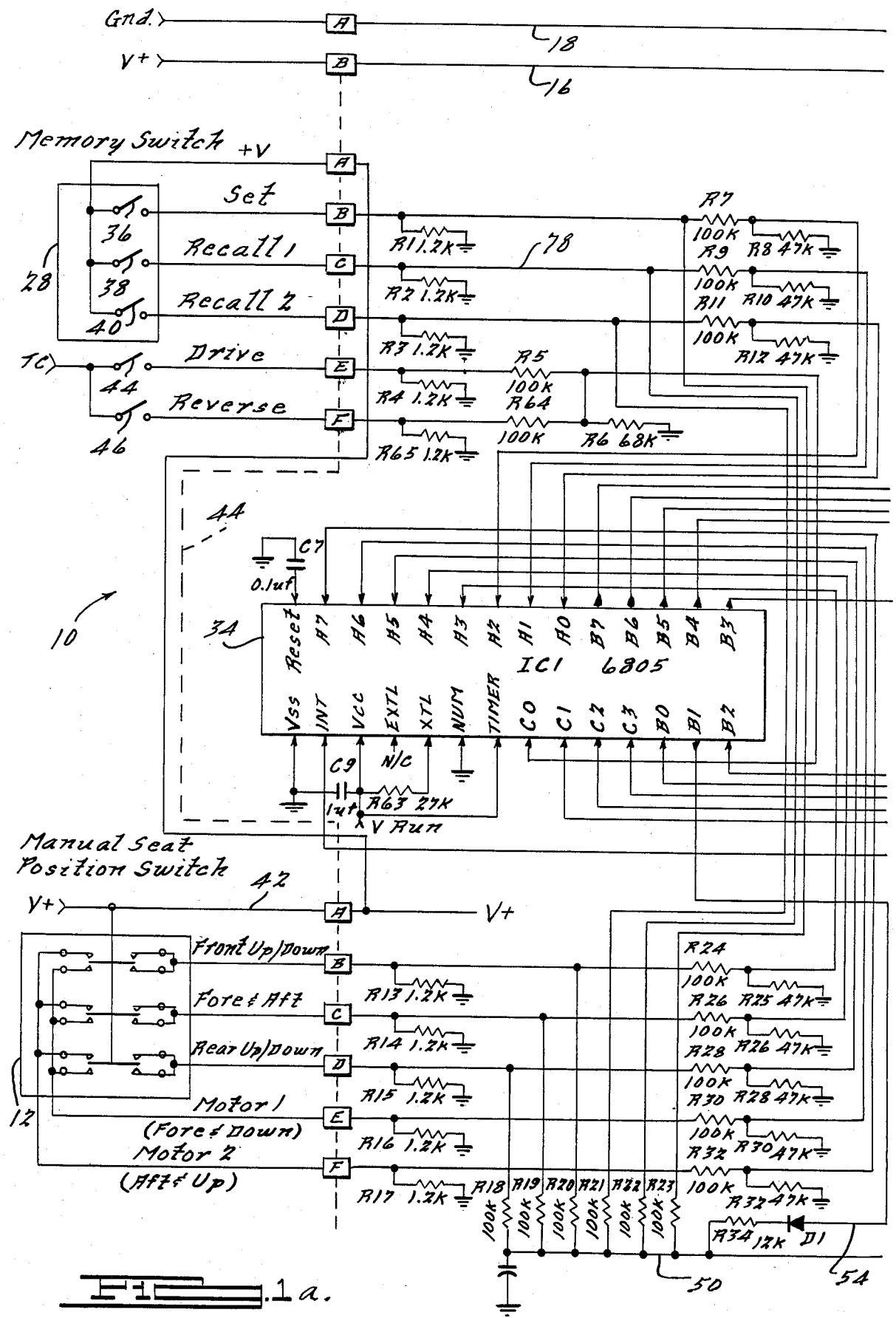

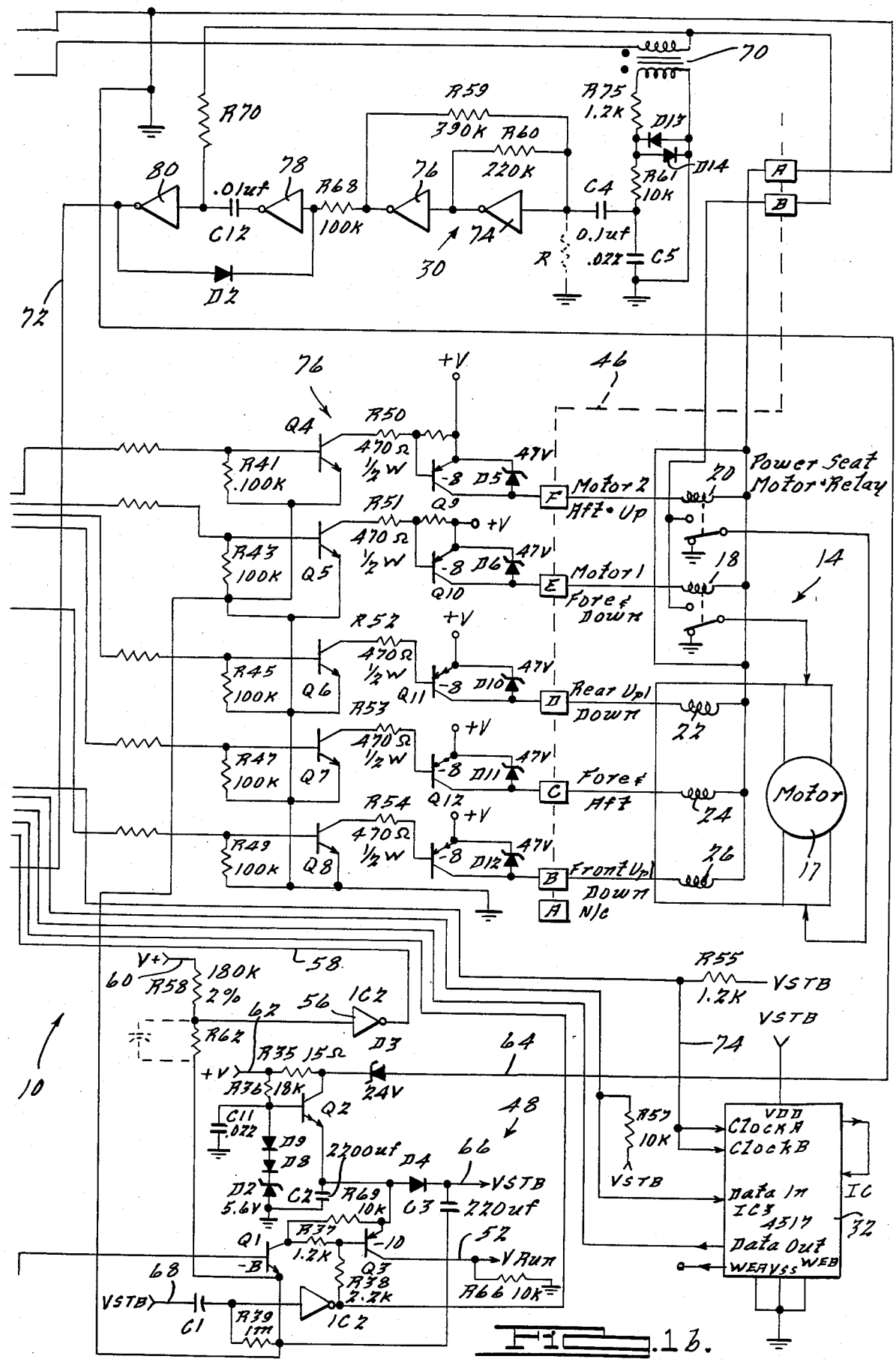

MEMORY POWER SEAT CONTROLLER

BACKGROUND AND SUMMARY OF THE INVENTION

The present invention relates generally to control systems for movable apparatus, and particularly to electronic controllers for automotive power seat systems.

Automotive seats are frequently equipped with power systems for selectively adjusting the position of the seats in several directions. One such system provides for three manually actuable switches which allow seat adjustments in six different directions. The first switch is a 4-way "joy-stick" type switch for controlling the movement in the forward or reverse directions and the upward or downward directions. The remaining two switches are each 2-way momentary toggle switches, one of which allows for front up or down movement and the other allows rear up or down movement.

Typically, two types of motive power systems have been employed for adjusting the direction of power seats in automobiles. One such motive power system comprises three separate d.c. motors which are each coupled to a rack mechanism for providing the appropriate number of position adjustments. A second type of motive power system employs a single motor coupled to three separate clutch mechanisms for selectively actuating three different rack assemblies. Both systems generally provide a control circuit which includes one or more "joy-stick" and/or toggle switches, and particular adjustments are made by actuating the appropriate switch and holding the switch in its actuated state until the desired seat position in the direction chosen is reached.

Because most automobiles are frequently driven by at least two people of different stature, such as a husband and wife, various control systems have recently been developed which provide means for storing different desired seat positions in a memory device for subsequent selective retrieval. In such systems, once a desired seating position has been established and stored in the memory device provided, the controller will automatically return the seat to the desired position upon the actuation of a separate "recall" switch. Typically, such control systems include two recall switches for selectively recalling either of two previously stored seating positions.

Accordingly, it is a principle object of the present invention to provide an improved electronic controller for adjusting the position of a movable apparatus, which features memory means for storing a plurality of desired positions for the movable apparatus.

It is a more specific object of the present invention to provide an improved electronic controller in an automotive power seat system having motive power means adapted to adjust the position of a seat and a first operator actuable switch group for generating command signals for manually adjusting the position of the seat.

It is another object of the present invention to provide an improved electronic controller which tracks the position of the automobile seat by detecting predetermined fluctuations in the current signal from a d.c. power source supplying electrical power to the motive power means for the power seat system.

It is an additional object of the present invention to provide an improved electronic controller which quickly detects a "stall" condition when the rack mechanism encounters a mechanical stop by monitoring the time between the predetermined current fluctuations.

It is also an object of the present invention to provide an improved electronic controller which features a "retract" mode which will cause the seat to assume its fully retracted and down reference position when both of the recall switches in a second operator actuable switch group are simultaneously actuated for permitting easy ingress egress from the automobile.

It is a further object of the present invention to provide an improved electronic controller which features an "abort" function, whereby actuation of any operator actuable switch in the first switch group will halt the execution of a previous "recall" or "retract" command currently in process.

It is a further object of the present invention to provide an improved electronic controller which includes a provision for maintaining standby power to the memory means for a predetermined time after the battery has been removed from the automobile or otherwise disconnected.

It is yet another object of the present invention to provide an electronic controller which includes a "reverse" function, whereby the motor of the motive power means is operated in the reverse direction momentarily when the motor is to be deactivated to ensure proper disengagement of a clutch mechanism.

To achieve the foregoing objects, the novel electronic controller according to the present invention features a microcomputer which receives command signals from a first and second group of operator actuable switches, present position signals from a monitoring circuit, and stored position signals from a memory circuit, for generating control signals for directing a motive power means to adjust the position of an automobile seat. In a standby mode, only the memory circuit is supplied with electrical power in order to minimize the power drain on the d.c. power source for the motive power means, i.e. typically an automobile battery. However, whenever any of the operator actuable switches are actuated to modify the position of the seat, a run mode is assumed and power is supplied to the microcomputer. An initialization sequence is commenced which includes down loading the stored position data from the memory circuit into the internal RAM memory circuit of the microcomputer.

The monitoring circuit includes transducer means for sensing the current draw from the d.c. power source, and differentiating means connected to the transducer means for generating a pulse concomitantly with each commutation of the motor from the motive power means. These pulse position signals are sent to the interrupt port of the microcomputer and then counted by an internal timer for determining the present position of the automotive seat. An important feature of the present invention is the use of these pulse position signals to determine a "stall" condition which occurs when the rack mechanism has encountered a mechanical stop, such as when the seat reaches its full forward position. The time between these pulses is monitored and a stall condition is determined when the time betwen these pulses exceeds a predetermined period (approximately 6 milliseconds). One advantage of this detection technique is that a stall condition may be detected relatively rapidly in comparision with prior detection techniques, such as monitoring the rate at which the current draw for the motor increases with respect to time.

Additional advantages and features of the present invention will become apparent from a reading of the detailed description of the preferred embodiment which makes reference to the following set of drawings in which:

BRIEF DESCRIPTION OF THE DRAWINGS

FIGS. 1a and 1b comprise a schematic diagram of an electronic controller according to the present invention.

DETAILED DESCRIPTION OF THE PREFERRED EMBODIMENT

Referring to FIGS. 1a and 1b, a schematic diagram of a system 10 for controlling the position of a movable apparatus, such as a automotive seat (not shown), employing an electronic controller according to the present invention is shown. The system 10 is provided with a manual switch group 12, and motive power means 14 operable from a d.c. power source via conductors 16 and 18. The manual switch group 12 includes three normally open rocker-type or toggle type switches for generating manual adjustment command signals for manually adjusting the position of the power seat in six different directions. These switches may comprise a four-way "joy-stick" type switch with two momentary toggle switches, or any other suitable combination of conventional switches for controlling the direction of seat adjustments. The motive power means 14 includes a single motor 17, relay coils 18 and 20 for controlling the direction of rotation for the motor, and clutch coil 22, 24 and 26 of a clutch mechanism (not shown) for directing the rotational force produced by the motor to the appropriate rack mechanism used to modify the position or attitude of the seat. As illustrated in FIG. 1b relay coil 18 is energized whenever it is desired to move the seat both forward and downwardly, and relay coil 20 is energized whenever it is desired to move the seat both rearwardly (or aft) and upwardly. Additionally, clutch coil 22 is energized in order to move the back or rear of the seat upwardly or downwardly, clutch coil 24 is energized in order to move the seat either forward or aft, and clutch 26 is energized in order to move the front of the seat upwardly or downwardly. It should be understood that the particular motive power means illustrated in FIG. 1b is intended to be exemplary only, and that other suitable motive power means may be employed in the appropriate application, such as three separate motors each coupled to a rack mechanism. Indeed, one of the advantages of the present invention is that the electronic controller is not specifically tied to a particular motive power means, but may be readily applied to other known motive power means.

The electronic controller according to the present invention generally comprises an automatic switch group 28, a monitoring circuit 30, a memory integrated circuit 32, and a microcomputer integrated circuit 34 which interconnects the automatic switch group, the monitoring circuit, the memory integrated circuit, as well as the manual switch group 12, and the motive power means 14. The automatic switch group 28 is used for generating automatic adjustment command signals for causing automatic adjustments in the position of the seat, and comprises a set switch 36, a first recall switch 38, and a second recall switch 40. Each of the recall switches 38 and 40 are used to both store and retrieve separate desired seat positions in the memory 32. In order to store a desired switch position, the set switch 36 must be actuated or closed within 7.5 seconds of the appropriate recall switch. Otherwise, the microcomputer 34 will assume that the operator desired to cancel the set status. In order to adjust the seat position to a previously stored position in the memory 32, the operator need only momentarily depress the appropriate recall switch and the microcomputer 34 will automatically generate the sequence of instructions or control signals to the motive power means 14 which will cause the necessary adjustments in the seat in order to reach the desired seat position. It should be noted that both the manual switch group 12 and the automatic switch group 28 are supplied with the electrical power necessary to generate the command signals via the voltage on line 42, which is the same magnitude as the voltage on line 16. The system 10 is also provided with a pair of switches 44 and 46 which are used to disable the system from automatically adjusting the position of the seat when the transmission of the automobile is in a drive or reverse state. The input "TC" for the switches 44 and 46 is derived from a conventional sensor in the automobile transmission system.

The dash line 44 represents a conventional pin connector which generally connects the output lines from the manual switch group 12 and the automatic switch group 28, as well as the conductors 16, 18 and 42 from the d.c. power source (not shown), to the circuitry of the electronic controller packaged in a suitable module. Similarly, the dash line 46 represents a conventional pin connector which connects the circuitry contained in the module to the motive power means 14. To enhance the reliability of the system 10, the electronic controller is provided with a voltage protection network which is operable to inhibit transient voltages from interfering with the normal operation of the system. The voltage protection network generally comprises voltage dividing resistors R1 through R17, R24 through R33, and R64 and R65.

The electronic controller also includes a power supply circuit generally indicated by reference numeral 48 for controlling the supply of electrical power to the microcomputer 34 and the memory 32 during a "standby" condition and a "run" condition. During the run condition the power supply circuit 48 operates to supply both the microcomputer 34 and the memory 32 with electrical power. However, during the standby condition only the memory 32 is supplied with electrical power in order to minimize the power drain on the d.c. power source (typically a 12 volt automotive battery). A run condition is created when any of the switches in the manual switch group 12 or the automatic switch group 28 are actuated. As indicated in FIG. 1a, all of the output lines from these two switch groups are tied to a conductor 50 through resistors R18-R23. Thus, when any of the manual or automatic switches are momentarily actuated a short HI signal is generated on conductor 50. This signal operates to switch on transistors Q1 and Q3, thereby creating a "VRUN" signal on conductor 52. As illustrated in FIG. 1a, this VRUN signal is connected to the "VCC" and "timer" input ports of the microcomputer 34, and provides the necessary voltage to operate the microcomputer. When the VRUN power signal is received by the microcomputer 34, an initialization sequence commences which includes the generation of a digitally HI logic signal on conductor 54 from the "B1" port of the microcomputer. Conductor 54 is connected to conductor 50 so that the HI logic signal on conductor 54 operates to latch the power supply circuit 48 into a run condition for a period of time necessary to execute the manual or automatic adjustments desired.

The power supply circuit 48 also provides for several other advantageous functions in the electronic controller according to the present invention. To insure that the voltage supplied to the motive power means 14 does not drop below the minimum operating voltage normally required, the power supply circuit 48 is provided with a voltage level detector which is comprised of resistors R58 and R62 and an invertor 56. This voltage level detector operates as a voltage divider which generates an appropriate signal on conductor 58 to the "C1" port of the microcomputer 34 when the voltage V+ on conductor 60 drops below nine volts. The power supply circuit 48 is also provided with another voltage level detector which operates to detect an abnormally high voltage from the d.c. power source on conductor 62. This voltage level detector includes a zener diode D3 whose threshold voltage is approximately twenty four volts. When the voltage V+ on conductor 62 exceeds the threshold voltage of the zener diode D3, the diode will conduct to permit current to flow on a conductor 64, which is connected to ground in order to protect the system from voltage transients. The power supply circuit 48 also includes a temperature compensation voltage regulator which generally comprises diodes D8 and D9 and zener diode D2. This temperature compensation voltage regulator operates to insure that the VRUN power signal does not drop below 4.75 volts at low temperatures. It should be noted that it is preferred for the diodes D8 and D9 to match the emitter-base diodes of the Darlington resistor Q2, which is also preferably a 6018-6 Darlington transistor.

As previously noted, during a standby condition electrical power is still applied to the memory 32. This power is derived from the V+ voltage signal on conductor 62, which is applied to a conductor 66 through the Darlington transistor Q2. This voltage signal on conductor 66 is referred to as the VSTB signal, and this signal is connected to the memory circuit 32 at the "VDD" port. In order to retain the seat position data retained in the memory 32, the VSTB power signal must be continuously applied to the memory. To insure that this seat position data is not lost when the d.c. power supply to the system 10 is interrupted, such as when the automobile battery is removed from the vehicle, the electronic controller is provided with capacitors C2 and C3 which have a sufficient capacity to operate the memory 32 for up to twenty four hours with the d.c. power source disconnected or otherwise disabled. It should be appreciated that this provision permits the automobile battery to be disconnected, such as when being recharged, without the desired seat positions stored in the memory being lost. It should also be noted that the VSTB power signal is also connected to the "C2" port of the microcomputer 34 via conductor 68 to provide a momentary LO digital logic signal to the microcomputer when electrical power is initially applied to the system. This low logic signal may be used for example to cause the microcomputer 34 to store the current seat position in the memory 32, such that the seat will be adjusted to the initial seat position at power up when either the recall switches 38 and 40 are actuated.

The monitoring circuit 30 includes a current sensing transformer 70 connected to the V+ conductor 16 which operates as a transducer for sensing the current draw from the d.c. power source. A pair of diodes D13 and D14 are provided to clip the alternating voltage across the secondary winding of the transformer 70 with respect to both positive and negative voltage peaks. The monitoring circuit 30 is also provided with a low pass filter comprising resistor R61 and capacitor C5 which serves to distinguish the predetermined current fluctuations desired to be sensed from unwanted noise present on the line.

During an adjustment of the seat position, the current fluctuations on conductor 16 desired to be sensed generally have a frequency below 200 hertz. Accordingly, the low pass filter serves to reject high frequency fluctuations which typically result from noise on the line.

The monitoring circuit also includes a capacitor C4 which operates to differentiate the voltage induced in the secondary winding of the transformer 70 and generate a pulse signal for each of the predetermined fluctuations in the current draw from the d.c. power source. These predetermined fluctuations are caused by the commutation of the motor 17, and accordingly represent an accurate means for monitoring the revolutions of the motor and hence the position of the seat. Thus, during an adjustment in the position of the seat, a predetermined fluctuation in the current draw through conductor 16 will occur concomitantly with the commutation of the motor 17, and the monitoring circuit 30 will generate a pulse signal indicative of the position of the seat at each of these commutations.

The monitoring circuit 30 also includes an amplifier which processes the pulse signal generated by the capacitor C4 before transmitting it to the microcomputer 34 on conductor 72. This amplifier comprises four inverters 74–80, resistors R58, R60, R68 and R70, capacitor C12, and diode D2. The amplifier provides a gain of approximately two, and also serves to more precisely waveshape the pulse signal. It should be noted that the electronic controller is provided with six inverters, including inverters 74–70 and inverter 56. These inverters are preferably contained in a single IC package, such as a CMOS 4069 inverter circuit and powered from the VSTB power signal on conductor 66.

Due to the high torque characteristics of typical motive power means motors, such as motor 17, it has been found that the monitoring circuit 30 generates a series of pulse signals on conductor 72 of a generally constant frequency during an adjustment in the seat position. In other words, the time between these pulse signals representing commutations in the motor 17 generally does not vary during the seat adjustment. However, when the rack mechanism encounters a mechanical stop, such as when the seat reaches its maximum position in the direction being adjusted, the load on the motor is substantially increased, thereby causing it to slow down. This will decrease the rate at which the motor commutates and thus decrease the frequency of the pulse signals on conductor 72. This situation is referred to as a "stall" condition, and is detected by the microcomputer 34 so that the microcomputer may de-energize the motive power means and proceed to the next manual or automatic command instruction.

The microcomputer 34 is provided with an internal timer which serves to count the pulse signals generated by the monitoring circuit on conductor 72 to track the position of the seat, so that the present position of the seat with respect to the seat position stored in the memory 32 may be determined by the microcomputer. The interval timer also monitors the time between the pulse signals on conductor 72 during an adjustment in the position of the seat in order to detect a stall condition. The microcomputer 34 is adapted to detect a stall condition when the time between the pulse signals on conductor 72 exceeds a predetermined period, which for system 10 is approximately 6 milliseconds. One advantage of this detection technique is that a stall condition may be detected relatively rapidly in comparison with other detection techniques, such as monitoring the rate at which the current draw for the motor increases with respect to time.

The microcomputer 34 is preferably a single integrated chip microcomputer, such as the American Micro Systems, Inc. S6805 microcomputer chip. This micro chip contains a central processing unit (CPU), an on-chip clock, a read only memory (ROM), a random access memory (RAM), 20 TTL/CMOS compatible I/O lines, and an 8-bit timer. It should be noted that in one form of the present invention, the output high voltage specification and the pull-up resistor network connecting I/O ports A0-A7 have been deleted from the S6805 microcomputer chip. A more detailed discussion of the construction and operation of the S6805 microcomputer chip may be found in the January, 1980 preliminary data sheet, which is hereby incorporated by reference. It should also be appreciated that other conventional microcomputers which are not packaged on a single integrated circuit may also be employed in accordance with the present invention.

With respect to the memory 32, in one form of the present invention this memory circuit comprises a CMOS 4517 shift register. This shift register is capable of storing 96 bits of seat position data, thereby permitting two preselected seat positions to be stored for subsequent retrieval. It should be noted that during the initialization sequence referred to earlier (when a run condition is detected), the microcomputer 34 generates a sequence of clock signals on a conductor 74 for downloading the position data from the memory 32 to the volatile RAM memory internal to the microcomputer. Similarly, in response to a termination of the run condition, the microcomputer 34 generates a sequence of clock signals on conductor 74 for loading the position data contained in the RAM memory for the two preselected seat positions into the memory 32.

The output lines from the microcomputer 34 to the motive power means 14 are connected to the I/O ports "B3"-"B7" of the microcomputer chip. The microcomputer 34 selectively generates control signals on these output lines in response to the manual and automatic command signals from the respective switch groups 12 and 28 to cause the motive power means 14 to adjust the position of the seat. The control signals on these output lines are then amplified by a separate amplifier circuit for each output line to a magnitude sufficient to energize the appropriate relay and clutch coils. These amplifier circuits, generally designated at reference numeral 76, and comprise transistors Q4-Q13, diodes D5-D12, and resistors R41-R54.

In operation, for example, when the first recall switch 38 is actuated or closed, an automatic adjustment command signal will be generated on conductor 78 and transmitted to the "A1" port of the microcomputer 34. It may be noted at this point that if the system 10 is not presently in a run condition, the command signal on conductor 78 will also be transmitted to the conductor 50 to cause the power supply circuit 48 to detect and assume a run condition, thereby applying the VRUN power signal to the microcomputer 34. In this situation, the initialization sequence will commence, and the two preselected seat positions will be downloaded from the memory 32 to the RAM memory of the microcomputer 34. The microcomputer 34 will then generate a sequence of control signals on the appropriate output lines from the ports "B3"-"B7" to cause the motive power means 14 to adjust the position of the seat to the previously stored seat position in the memory 32 corresponding to the recall switch selected. As the seat adjustments are executed, pulse signals on conductor 72 will be sent to the microcomputer 34 from the monitoring circuit 30 to provide the feedback necessary for the microcomputer to track the position of the seat. When the number of pulse signals counted by the microcomputer have reached the limit corresponding to the desired seat position in the direction being adjusted, the microcomputer will modify the control signals in order to de-energize the motive power means 14. Additionally, if a stall condition has been detected by the microcomputer 34 from an increase in the time between the pulse signals on conductor 72, the control signals will also be modified to de-energize the motive power means 14. The microcomputer 34 will then proceed to execute the next directional adjustment in the seat position until the desired seat position in all directions has been reached.

A significant feature of the electronic controller according to the present invention is a "retract" mode which will cause the seat to assume its full back, full retracted, and full down reference or home position when both of the recall switches 38 and 40 are simultaneously actuated. This retract mode is used to facilitate easy egress and exit from the automobile by causing the seat to automatically assume the position which allows for the maximum room between the dashboard of the vehicle and the seat. In one form of the present invention the electronic controller permits a predetermined time period of approximately 0.5 seconds between the momentary closing of both of the recall switches 38 and 40 for the microcomputer 34 to detect an operator request for the retract mode.

Another important aspect of the electronic controller is the provision of an "abort" feature whereby the actuation of any of the switches in the manual switch group 12 will halt the execution of a previous recall or retract command currently in progress. Thus, if the wrong recall switch is inadvertently actuated by the operator, the momentary closing of any of the manual switches will cause all automatic adjustments in the position of the seat to cease. It should also be noted that in this situation the microcomputer 34 will not execute the particular adjustment command corresponding to the manual switch actuated.

Another advantageous feature of the electronic controller according to the present invention is the provision of a "reverse" function, whereby the motor 17 is operated in the reverse direction momentarily when the motor is about to be de-activated. This momentary reversal serves to insure the proper disengagement of the clutch mechanism before the next seat adjustment is executed.

It will be appreciated that the above disclosed embodiment is well calculated to achieve the aforementioned objects of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

What is claimed is:

1. In a system for controlling the position of a movable apparatus, having motive power means including at least one motor operable from a d.c. power source and adapted to adjust the position of said movable apparatus, and first operator actuable switch means for generating manual adjustment command signals, the improvement comprising:

second operator actuable switch means for generating automatic adjustment command signals;

monitoring circuit means for generating a pulse signal indicative of the position of said movable apparatus by monitoring predetermined current fluctuations in the supply line from said d.c. power source to said motor during an adjustment in the position of said movable apparatus;

memory means for storing a plurality of positions for subsequent recall in response to said automatic adjustment command signals; and microcomputer means, interconnecting said first and second operator actuable switch means, said monitoring circuit means, said memory means and said motive power means, for tracking the position of said movable apparatus by counting the number of said pulse signals, for selectively generating control signals in response to said command signals operable to cause said motive power means to adjust the position of said movable apparatus, and for detecting a stall condition by monitoring the time between said pulse signals during an adjustment in the position of said movable apparatus.

2. The invention according to claim 1, wherein said stall condition is determined when the time between said pulse signals exceeds a predetermined time period.

3. The invention according to claim 2, wherein said microcomputer means generates a control signal operable to de-energize said motive power means when said stall condition has been detected.

4. The invention according to claim 3, wherein said predetermined current fluctuations in the supply line from said d.c. power source to said motor occur concomitantly with each commutation of said motor, and said monitoring circuit means includes transducer means for sensing the current draw from said d.c. power source and differentiating means connected to said transducer means for generating a pulse signal for each commutation of said motor.

5. The invention according to claim 1, wherein both said first and second operator actuable switch means include a plurality of normally open switches, and said second operator actuable switch means includes first and second recall switches, each of which being operable to generate an automatic adjustment command signal for directing said microcomputer means to generate a sequence of control signals for causing said motive power means to adjust the position for said movable apparatus to a previously stored position in said memory means.

6. The invention according to claim 5, wherein said microcomputer means generates a sequence of control signals for causing said motive power means to adjust said movable apparatus to a referenced position in response to the substantially simultaneous momentary closing of both said first and second recall switches.

7. The invention according to claim 1, wherein said microcomputer generates a control signal operable to de-energize said motive power means in response to the momentary closing of any of said first operator actuable switch means during an automatic adjustment of said movable apparatus.

8. The invention according to claim 1, further including power supply circuit means for controlling the supply of electrical power to said microcomputer means and said memory means during a standby and a run condition, such that during said run condition both said microcomputer means and said memory means are supplied with electrical power and during said standby condition only said memory means is supplied with electrical power.

9. The invention according to claim 8, wherein said power supply circuit means determines a run condition in response to a momentary closing of any of said first and second operator actuable switch means.

10. The invention according to claim 9, wherein said microcomputer means generates a control signal for latching said power supply circuit means into a run condition for a predeterminable time period in response to an initial run condition detected by said power supply circuit means.

11. The invention according to claim 8, wherein said power supply circuit means includes capacitor storage means for maintaining a supply of electrical power to said memory means for a predetermined time period in response to a disconnection of said d.c. power source from said system.

12. The invention according to claim 5, wherein said second operator actuable switch means further includes a set switch for generating an automatic adjustment command signal selectively operable in combination with said command signals generated by said first and second recall switches to direct said microcomputer means to store a selected position in said memory means.

13. The invention according to claim 12, herein said microcomputer means generates a sequence of clock signals in response to an initialization of said run condition for downloading the position data representing selected positions of said movable apparatus from said memory means to a volatile memory internal to said microcomputer means, and said microcomputer means generates a sequence of clock signals in response to a determination of said run condition for loading the position data contained in said volatile memory into said memory means.

14. The invention according to claim 1 wherein said movable apparatus comprises an automobile seat.

15. A method of detecting and responding to a stall condition in a system for controlling the position of a movable apparatus, having motive power means including at least one motor operable from a d.c. power source and adapted to adjust the position of said movable apparatus, first operator actuable switch means for generating manual adjustment command signals, and a microcomputer based electronic controller, comprising the steps of:

sensing the current draw from said d.c. power source;

generating a pulse signal indicative of the position of said movable apparatus from predetermined current fluctuations in the supply line from said d.c. power source to said motor during an adjustment in the position of said movable apparatus;

monitoring the time between said pulse signals during said adjustment in the position of said movable apparatus;

determining said stall condition when the time between said pulse signals exceeds a predetermined time period; and de-energizing said motive power means when said stall condition has been detected.

16. The method according to claim 15, wherein said pulse signals are generated concomitantly with the commutation of said motor.

17. The method according to claim 16, wherein said predetermined time period is between four and eight milliseconds.

* * * * *